(12) United States Patent
Strandborg

(10) Patent No.: US 12,113,956 B1
(45) Date of Patent: Oct. 8, 2024

(54) MULTISCOPIC DISPLAY USING STACKED LIQUID CRYSTAL LAYERS

(71) Applicant: Lasia Oy, Helsinki (FI)

(72) Inventor: Mikko Strandborg, Hangonkylä (FI)

(73) Assignee: DISTANCE TECHNOLOGIES Oy, Helsinki (FI)

( * ) Notice: Subject to any disclaimer, the term of this patent is extended or adjusted under 35 U.S.C. 154(b) by 0 days.

(21) Appl. No.: 18/636,976

(22) Filed: Apr. 16, 2024

(51) Int. Cl.
  *H04N 13/383* (2018.01)
  *G02F 1/13* (2006.01)
  *G02F 1/1335* (2006.01)
  *G02F 1/13357* (2006.01)
  *H04N 13/337* (2018.01)
  *H04N 13/398* (2018.01)

(52) U.S. Cl.
  CPC ......... *H04N 13/398* (2018.05); *G02F 1/1313* (2013.01); *G02F 1/133531* (2021.01); *G02F 1/133606* (2013.01); *G02F 1/13362* (2013.01); *H04N 13/337* (2018.05); *H04N 13/383* (2018.05)

(58) Field of Classification Search
  CPC .. H04N 13/398; H04N 13/337; H04N 13/383; G02F 1/133531; G02F 1/1313; G02F 1/133606; G02F 1/13362
  See application file for complete search history.

(56) References Cited

U.S. PATENT DOCUMENTS

| | | | | |
|---|---|---|---|---|
| 2014/0118824 A1* | 5/2014 | Hsieh | ..................... | G02B 30/31 |
| | | | | 359/464 |
| 2014/0176910 A1* | 6/2014 | Mahn | ..................... | G03B 35/18 |
| | | | | 359/449 |
| 2020/0336723 A1* | 10/2020 | De Jong | .............. | H04N 13/327 |

\* cited by examiner

*Primary Examiner* — Mohamed A. Wasel
(74) *Attorney, Agent, or Firm* — Ziegler IP Law Group, LLC

(57) ABSTRACT

A first virtual image and a second virtual image are obtained, based on a relative location of a first eye and a second eye of user(s) with respect to an image plane of a display device. The display device includes a backlight, a first polarizer and a second polarizer, a first liquid crystal (LC) layer and a second LC layer arranged between the first polarizer and the second polarizer and having a gap. Drive signals are generated, based on the first virtual image, the second virtual image, and the relative location of the first eye and the second eye. The first LC layer and the second LC layer are controlled using the drive signals, to adjust a polarization of light passing therethrough, for producing a synthetic light field presenting the first virtual image and the second virtual image to the first eye and the second eye, respectively.

20 Claims, 5 Drawing Sheets

MULTISCOPIC DISPLAY USING STACKED LIQUID CRYSTAL LAYERS

TECHNICAL FIELD

The present disclosure relates to systems incorporating multiscopic display using stacked liquid crystal layers. The present disclosure also relates to methods incorporating multiscopic display using stacked liquid crystal layers.

BACKGROUND

Robust autostereoscopy and multiscopy are largely unsolved problems. There exist various different types of autostereoscopic displays. However, existing autostereoscopic displays suffer from several drawbacks.

Firstly, crosstalk is a significant problem in existing autostereoscopic displays. Lenticular arrays or parallax barriers are conventionally used to direct light to different eyes of a user; however, an imperfect alignment or a poor design results in crosstalk. Crosstalk not only leads to a degradation in a three-dimensional (3D) visual scene presented to user(s), but also causes visual discomfort and reduces an overall quality of the users' viewing experience.

Secondly, low resolution poses significant challenges in existing autostereoscopic displays, impacting the quality of the 3D visual scene. When displaying virtual content on low-resolution autostereoscopic displays, aliasing artifacts and jagged edges may become even more noticeable, particularly in high-contrast or detailed visual scenes. This can greatly detract from a realism and immersiveness of the 3D visual scene.

Thirdly, low brightness levels can make it difficult for users to discern visual details and perceive colours, particularly in brightly lit environments or when viewing content with dark scenes. This can lead to eyestrain and reduced usability, as users may struggle to perceive the 3D visual scene.

Fourthly, narrow viewing angles is another significant challenge in existing autostereoscopic displays, impacting the overall user experience and usability. As a user moves away from an optimal viewing position, ghosting artifacts become pronounced, thereby causing discomfort.

Fifthly, due to a narrow field of view provided by the existing autostereoscopic displays, only a limited portion of the 3D visual scene may be visible in 3D, restricting a spatial coverage and immersiveness of the 3D visual scene. Moreover, a narrow field of view can create visual discontinuities, where objects or elements within the 3D visual scene abruptly transition between 3D and 2D as the user's perspective changes. This can be jarring and may disrupt a sense of continuity and realism in the user's viewing experience.

Therefore, in light of the foregoing discussion, there exists a need to overcome the aforementioned drawbacks.

SUMMARY

The present disclosure seeks to provide novel systems and novel methods for presenting, to one or more users, high-resolution and artefact-free virtual content via a synthetic light field at an optimal brightness and a wide field of view, as compared to the prior art. The aim of the present disclosure is achieved by systems and methods which incorporate multiscopic display using stacked liquid crystal layers, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
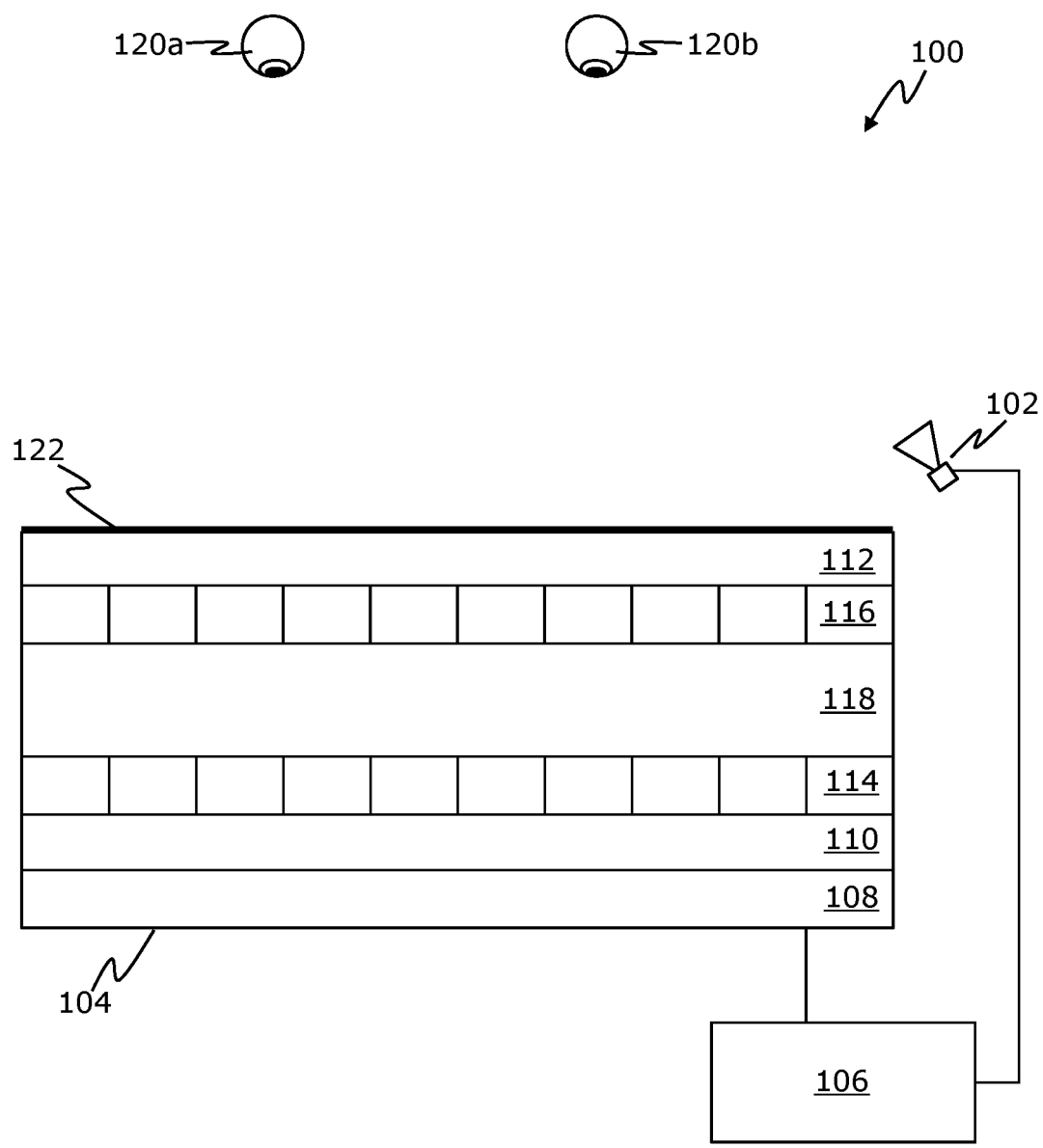
FIG. 1A is a schematic illustration of a system incorporating multiscopic display using stacked liquid crystal layers, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  tracking means;
  a display device comprising:
    a backlight;
    a first polarizer and a second polarizer having a first polarization orientation and a second polarization orientation, respectively, wherein the first polarizer is arranged between the backlight and the second polarizer; and
    a first liquid crystal (LC) layer and a second LC layer arranged between the first polarizer and the second polarizer, the first LC layer being adjacent to the first polarizer, the second LC layer being adjacent to the second polarizer, wherein the first LC layer and the second LC layer have a gap therebetween, each of the first LC layer and the second LC layer comprising a plurality of LC cells; and
  at least one processor configured to:
    utilise the tracking means to determine a relative location of a first eye and of a second eye of at least one user with respect to an image plane of the display device;

obtain a first virtual image and a second virtual image to be presented to the first eye and the second eye of the at least one user, respectively, based on the relative location of the first eye and of the second eye of the at least one user with respect to the image plane; and generate drive signals for the LC cells of the first LC layer and the LC cells of the second LC layer, based on the first virtual image, the second virtual image, and the relative location of the first eye and of the second eye of the at least one user with respect to the image plane, wherein the LC cells of the first LC layer and the LC cells of the second LC layer are controlled using the drive signals, to adjust a polarization of light passing therethrough, for producing a synthetic light field presenting the first virtual image and the second virtual image to the first eye and the second eye of the at least one user, respectively.

In a second aspect, an embodiment of the present disclosure provides a method comprising:

utilising tracking means to determine a relative location of a first eye and of a second eye of at least one user with respect to an image plane of a display device, the display device comprising a backlight, a first polarizer and a second polarizer, the first polarizer being arranged between the backlight and the second polarizer, and a first liquid crystal (LC) layer and a second LC layer arranged between the first polarizer and the second polarizer, the first LC layer being adjacent to the first polarizer, the second LC layer being adjacent to the second polarizer, wherein the first LC layer and the second LC layer have a gap therebetween, each of the first LC layer and the second LC layer comprising a plurality of LC cells;

obtaining a first virtual image and a second virtual image to be presented to the first eye and the second eye of the at least one user, respectively, based on the relative location of the first eye and of the second eye of the at least one user with respect to the image plane;

generating drive signals for the LC cells of the first LC layer and the LC cells of the second LC layer, based on the first virtual image, the second virtual image, and the relative location of the first eye and of the second eye of the at least one user with respect to the image plane; and controlling the LC cells of the first LC layer and the LC cells of the second LC layer using the drive signals, to adjust a polarization of light passing therethrough, for producing a synthetic light field presenting the first virtual image and the second virtual image to the first eye and the second eye of the at least one user, respectively.

The present disclosure provides the aforementioned system and the aforementioned method incorporating multiscopic display using stacked liquid crystal layers. This is made possible due to the gap between the first LC layer and the second LC layer, which leads to a parallax effect.

Notably, different eyes of the at least one user (namely, different viewpoints) see virtual content through different LC cells in the first LC layer and the second LC layer, which enables to achieve autostereoscopy and multiscopy. Such a novel system and method are susceptible to be utilised for presenting, to one or more users, high-resolution and artefact-free virtual content via a synthetic light field at an optimal brightness and a wide field of view, as compared to the prior art. As there is no optical element that unnecessarily and unintentionally blocks light emanating from a backlight to passthrough, the system eliminates the problem of low brightness levels, which is encountered in conventional autostereoscopic displays (comprising optical elements, such as lenticular arrays or parallax barriers). Moreover, the drive signals for controlling the LC cells of the first LC layer and the LC cells of the second LC layer are generated precisely and accurately based on the relative location of the first eye and of the second eye of the at least one user with respect to the image plane. This allows the system to not only eliminate the problem of crosstalk, but also widen viewing angles from which the at least one user can view the virtual content being presented. Furthermore, the system and method are susceptible to be implemented with display devices of any dimension and native resolution. In other words, the system and method can be leveraged to generate virtual content at a high resolution (for example, such as 60 pixels per degree or more) and at a wide field of view, as compared to the prior art.

It will be appreciated that the first virtual image and the second virtual image, when presented to the first eye and the second eye of the at least one user, respectively, correspond to a first part and a second part of the synthetic light field. As is well known, presenting slightly different virtual images (namely, slightly offset virtual images) to the eyes of the at least one user enables the at least one user to perceive depth in the virtual content being presented through these virtual images. This can be easily leveraged, to facilitate the multiscopic display in case of multiple users also. Moreover, in some implementations, the synthetic light field can also be presented to a camera. In such a case, a relative location of a camera lens of said camera with respect to the image plane can be determined by utilising the tracking means; a virtual image to be presented to the camera can then be obtained accordingly, and taken into account when generating the drive signals. It will be appreciated that said camera could be a camera of a user device, or could be a camera arranged in a space in which the at least one user is present. The user device could, for example, be a smartphone, a laptop, a tablet, a phablet, or the like.

Throughout the present disclosure, the term "tracking means" refers to a specialised equipment for detecting and/or following a location of at least a first eye and a second eye of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images.

It will be appreciated that the at least one tracking camera is arranged to face the at least one user, to facilitate tracking of the location of the user's eyes. A relative location of the at least one tracking camera with respect to the image plane of the display device is fixed, and is pre-known. A location of the first eye and of the second eye with respect to the at least one tracking camera can be accurately determined. Thus, the relative location of the first eye and of the second eye with respect to the image plane can be determined, based on the relative location of the at least one tracking camera with respect to the image plane, and the location of the first eye and of the second eye with respect to the at least one tracking camera. It will be appreciated that the tracking means tracks both eyes of the at least one user with a significantly high accuracy and precision, such that an error in determining the relative location may, for example, be minimised to within a tolerance range of approximately (+/−) 8 millimetres.

It will be appreciated that the tracking means is employed to repeatedly track the location of the eyes of the given user throughout a given session. This allows for repeatedly determining the relative location of the first eye and of the second eye with respect to the image plane in real time or near-real time. It is to be understood that when the synthetic light field is being produced for a plurality of users simultaneously, relative locations of both eyes of each user from amongst the plurality of users are determined in a same manner as discussed hereinabove.

Moreover, optionally, the at least one processor is configured to:
  utilise the tracking means to determine a relative location of a head of the at least one user with respect to the image plane of the display device; and
  refine the relative location of the first eye and of the second eye, based on the relative location of the head of the at least one user.

It will be appreciated that the tracking data collected by the tracking means can be utilised to determine the relative location of the head of the at least one user with respect to the image plane. As the first eye and the second eye are present at a fixed location on the head of the at least one user, any change in the relative location of the head highly likely results in similar corresponding changes in the relative location of the first eye and of the second eye. Such a refinement may involve employing geometric transformations (namely, geometric adjustments) on the (tracked) relative location of the first eye and of the second eye, based on a change in the relative location of the head. A technical benefit of refining the relative location of the first eye and the second eye is that the refined relative location of the first eye and the second eye can be utilised to generate the first virtual image and the second virtual image more accurately. This will enable the system to improve realism and immersiveness of the synthetic light field so produced.

The at least one processor controls an overall operation of the system. The at least one processor is communicably coupled to at least the tracking means and the display device. Optionally, the at least one processor is implemented as a processor of the display device. Alternatively, optionally, the at least one processor is implemented as a processor of a computing device that is communicably coupled to the display device. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

In some implementations, when obtaining the first virtual image and the second virtual image, the at least one processor is configured to generate the first virtual image and the second virtual image from a perspective of the relative location of the first eye and of the second eye of the at least one user with respect to the image plane, by employing a three-dimensional (3D) model of at least one virtual object. It will be appreciated that the relative location of the first eye and of the second eye with respect to the image plane indicate a viewing direction of the first eye and a viewing direction of the second eye, respectively. Therefore, the first virtual image and the second virtual image are generated based on these viewing directions. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the first virtual image and the second virtual image in a form of two-dimensional (2D) user interface (UI) elements. The 2D UI elements could pertain to, for example, a virtual navigation tool, a virtual gadget, a virtual message, a virtual entity, a virtual entertainment media, a virtual information, or similar.

Pursuant to embodiments of the present disclosure, the first polarizer and the second polarizer are linear polarizers. The first polarizer and the second polarizer are arranged on an optical path of the backlight. Light emitted by the backlight first passes through the first polarizer, and then the second polarizer. The first polarization orientation and the second polarization orientation can be implemented in various ways. Optionally, the first polarization orientation and the second polarization orientation are orthogonal to each other. As an example, one of the first polarizer and the second polarizer may be a vertically oriented polarizer having a vertical polarization orientation, while another of the first polarizer and the second polarizer may be a horizontally oriented polarizer having a horizontal polarization orientation. It will be appreciated that the first polarization orientation and the second polarization orientation are not limited to the vertical polarization orientation and the horizontal polarization orientation. It will also be appreciated that the first polarization orientation and the second polarization orientation need not be orthogonal to each other.

The first LC layer and the second LC layer may be made of a same LC material or different LC materials. Examples of such LC materials include, but are not limited to, twisted nematic (TN) LCs, TN LCs with positive or negative optical retardation (TN-PO or TN-NO), ferroelectric LCs (FLCs), and electrically controlled birefringence (ECB) LCs. LC molecules in a given LC layer (namely, the first LC layer or the second LC layer) can be oriented in an in-plane switching (IPS) arrangement or a vertical alignment (VA) arrangement. IPS and VA arrangements are well known in the art.

The aforementioned components of the display device are arranged in a following order: backlight→first polarizer→first LC layer→second LC layer→second polarizer. In some implementations, the gap between the first LC layer and the second LC layer is filled with air or some other fluid. In other implementations, the gap is implemented as a glass substrate or any other optically-transparent substrate.

In some implementations, there is no colour filter array (CFA) in the display device. In such a case, the synthetic light field produced by the display device is monochrome. In other implementations, the display device comprises a CFA that is arranged on the optical path of the backlight. In such implementations, the LC cells of the first LC layer and the LC cells of the second LC layer correspond to sub-pixels of a plurality of pixels. The CFA can be arranged anywhere on the optical path. Optionally, the CFA is arranged adjacent to the first LC layer or the second LC layer. By "adjacent", it is meant that the CFA is arranged either before or after a given LC layer (namely, the first LC layer or the second LC layer), and there is a negligible gap between the CFA and the given LC layer. A technical benefit of such an arrangement of the CFA is that there is no subpixel light leakage in the display device. This eliminates crosstalk and ghosting artefacts in the synthetic light field produced by the display device. More optionally, the CFA is arranged adjacent to the second LC layer, and between the second LC layer and the second polarizer. In such a case, a background of the second LC layer is monochrome, while a foreground of the second LC layer has the CFA.

In some implementations, the image plane of the display device is an outermost surface of the display device from which the light emits. This is particularly a case when no optical combiner is used in the system. In other implementations, an optical combiner and/or other optical elements (for example, such as one or more mirrors, one or more lenses, or a combination thereof) of the system may be arranged on an optical path between the display device and the at least one user. In such implementations, the image plane is an imaginary image plane.

There will now be described how the drive signals can be generated for the LC cells of the first LC layer and the LC cells of the second LC layer, based on the first virtual image, the second virtual image, and the relative location of the first eye and of the second eye of the at least one user with respect to the image plane.

In a first implementation, when generating the drive signals, the at least one processor is configured to:

for a given LC cell of the second LC layer,
determine a first viewing direction and a second viewing direction from which the first eye and the second eye view the given LC cell of the second LC layer, respectively, based on a location of the given LC cell in the second LC layer, and the relative location of the first eye and of the second eye of the at least one user with respect to the image plane;
determine a first LC cell and a second LC cell of the first LC layer that lie along the first viewing direction and the second viewing direction, respectively;
determine a first pixel location of a given first pixel of the first virtual image, based on the first viewing direction and the relative location of the first eye with respect to the image plane;
determine a second pixel location of a given second pixel of the second virtual image, based on the second viewing direction and the relative location of the second eye with respect to the image plane;
fetch, from the first pixel location in the first virtual image, a first intensity value of the given first pixel of the first virtual image;
fetch, from the second pixel location in the second virtual image, a second intensity value of the given second pixel of the second virtual image; and
generate respective drive signals for the given LC cell of the second LC layer, the first LC cell of the first LC layer and the second LC cell of the first LC layer, based on the first intensity value of the given first pixel of the first virtual image, and the second intensity value of the given second pixel of the second virtual image.

The aforementioned steps have been provided with respect to the given LC cell of the second LC layer. These steps can be performed in a similar manner for other LC cells of the second LC layer, to generate the drive signals for all the LC cells of the first LC layer and all the LC cells of the second LC layer.

A field of view that is provided by the display device to the at least one user can be determined, based on dimensions of the second LC layer and the relative location of the first eye and of the second eye of the at least one user with respect to the image plane of the display device. The first viewing direction and the second viewing direction from which the first eye and the second eye view (namely, see) the given LC cell of the second LC layer, respectively, can then be determined, based on the field of view provided by the display device and the location of the given LC cell in the second LC layer.

The first LC cell and the second LC cell of the first LC layer that lie along the first viewing direction and the second viewing direction, respectively, can then be determined, based on a width of the gap between the first LC layer and the second LC layer, a size of an LC cell in the first LC layer, and a size of an LC cell in the second LC layer (which may be same as or different from the size of the LC cell in the first LC layer). It will be appreciated that the LC cells of the first LC layer may or may not be aligned with the LC cells of the second LC layer. In a case where the LC cells of the first LC layer are not aligned with the LC cells of the second LC layer, the determination of the first LC cell and the second LC cell of the first LC layer (that lie along the first viewing direction and the second viewing direction, respectively) would also depend on a lateral shift in the alignment of the LC cells of the first LC layer with respect to the LC cells of the second LC layer.

The first pixel location of the given first pixel of the first virtual image can be determined by intersecting the first viewing direction with the image plane. For this purpose, the first viewing direction can be considered to be originating from the relative location of the first eye with respect to the image plane. The second pixel location of the given second pixel of the second virtual image can be determined in a similar manner.

The respective drive signals for the given LC cell of the second LC layer, the first LC cell of the first LC layer and the second LC cell of the first LC layer are then generated, based on the first intensity value of the given first pixel of the first virtual image, and the second intensity value of the given second pixel of the second virtual image. Such generation of the drive signals can be performed by solving linear equations, for example, as described in more detail below. It will also be appreciated that not only there will be linear equations corresponding to different LC cells of the second LC layer, but also there will be interdependencies in these linear equations. This is primarily due to a fact that a particular LC cell in the second LC layer is utilised to generate two different pixels per user (because both the eyes see light passing through that particular LC cell), while its corresponding LC cells in the first LC layer are also utilised to generate two different pixels per user (because both the eyes see light passing through these corresponding LC cells also).

Optionally, when generating the respective drive signals for the given LC cell, the first LC cell and the second LC cell, the at least one processor is configured to:
  determine, based on the first intensity value, a first output angle to be generated between the second polarization orientation of the second polarizer and a polarization orientation of light incident upon the second polarizer after passing through the first LC cell and the given LC cell; and
  determine, based on the second intensity value, a second output angle to be generated between the second polarization orientation of the second polarizer and a polarization orientation of light incident upon the second polarizer after passing through the second LC cell and the given LC cell,
wherein the respective drive signals for the given LC cell of the second LC layer, the first LC cell of the first LC layer and the second LC cell of the first LC layer are generated based on the first output angle and the second output angle.

An overall intensity of light passing through the second polarizer depends on an output angle between the second polarization orientation of the second polarizer and a polarization orientation of said light. This is based on a fact that a given polarizer only allows to pass through an entirely of light whose polarization orientation is same as a given polarization orientation of the given polarizer. As an example, if a stream of photons (namely, light) has a polarization orientation that makes an angle of 45 degrees from the given polarization orientation of the given polarizer, only half of the photons would pass through the given polarizer.

By determining the first output angle and the second output angle corresponding to the first intensity value and the second intensity value, respectively, individual drive signals for the given LC cell of the second LC layer, the first LC cell of the first LC layer and the second LC cell of the first LC layer can be generated by solving two linear equations. One of the two linear equations takes into account an angle of rotation by which the first LC cell of the first LC layer is to rotate the light passing therethrough and an angle of rotation by which the given LC cell of the second LC layer is to rotate the light passing therethrough, such that these angles of rotations result in the first output angle. Another of the two linear equations takes into account an angle of rotation by which the second LC cell of the first LC layer is to rotate the light passing therethrough and the angle of rotation by which the given LC cell of the second LC layer is to rotate the light passing therethrough, such that these angles of rotations result in the second output angle. These two linear equations are also interdependent on two other linear equations for two other LC cells of the second LC layer (corresponding to the first LC cell and the second LC cell of the first LC layer), which are again interdependent on other linear equations.

It will be appreciated here that gamma correction is optionally applied to the aforesaid intensity values, to adjust a brightness of the display device. Gamma correction make the brightness of the display device uniform, and is well known in the art.

Moreover, in some implementations, both the first LC layer and the second LC layer are configured to rotate the light passing therethrough in a same direction, namely, either clockwise or anti-clockwise. In such implementations, at least one of: the first LC layer, the second LC layer can be configured to have a full range of rotation of 0 to 180 degrees. It will be appreciated that such a configuration of the at least one of: the first LC layer, the second LC layer is physically possible to create, but is not commonly manufactured by display manufacturers, because such a configuration is not required in conventional LC displays. Notably, a range of rotation of 0 to 90 degrees is sufficient for conventional LC displays, because an additional range of rotation of 90 to 180 degrees would simply re-produce same resulting light intensities that are already reproducible with the range of rotation of 0 to 90 degrees. Pursuant to the present disclosure, configuring the at least one of: the first LC layer, the second LC layer to have the full range of rotation of 0 to 180 degrees makes it possible to reach every single intensity value from an arbitrary starting orientation. In other words, if a single LC cell is configured to have a range of rotation of 0 to 90 degrees only, it is not possible to reach every single intensity value from an arbitrary starting orientation. As an example, in a worst-case scenario, if the first polarization orientation (of the first polarizer) and the second polarization orientation (of the second polarizer) are orthogonal to each other, and if the first LC cell in the first LC layer is controlled to rotate the polarization orientation of the light to 45 degrees, the given LC cell in the second LC layer can be controlled to reach a total rotation range of 45 to 135 degrees only. In such a case, the second LC layer can only add light (because 45 degrees is equivalent to medium grey, 90 degrees is equivalent to full intensity, and 135 degrees is equivalent to 45 degrees). Thus, configuring the first LC layer and the second LC layer to have the range of rotation of 0 to 90 degrees only would lead to an optimization problem where it would be required to determine a combination of rotation angles for all LC cells in both the first LC layer and the second LC layer where all LC cells emit light of intended intensity values towards all viewing directions with a minimal error. Moreover, in such a case, there may be certain combinations of intensity values that may not be simply achievable.

In other implementations, at least one of: the first LC layer, the second LC layer is configured to rotate the light passing therethrough in any direction, namely, clockwise or anti-clockwise. In other words, the at least one of: the first LC layer, the second LC layer may rotate the light in a clockwise direction at a given time instant, and may rotate the light in an anti-clockwise direction at another given time instant. In such implementations, the first LC layer and the second LC layer can be configured to have a full range of rotation of 0 to 90 degrees only. However, at least one of: the first LC layer, the second LC layer can alternatively be configured to have a full range of rotation of 0 to 180 degrees. Configuring the at least one of: the first LC layer, the second LC layer to rotate the light in any direction (namely, clockwise and anti-clockwise at different time instants) makes it possible to reach every single intensity value from an arbitrary starting orientation. Optionally, in operation, a direction in which the given LC cell rotates the polarization orientation of the light is opposite to a direction in which at least one of: the first LC cell, the second LC cell rotates the polarization orientation of the light. This allows for simplifying the linear equations, thereby saving processing resources of the at least one processor. This also allows for achieving accurate colour reproduction according to the first virtual image and the second virtual image.

There will now be considered an example, for illustration purposes only, wherein: (i) the first polarization orientation (of the first polarizer) and the second polarization orientation (of the second polarizer) are orthogonal to each other, (ii) the first output angle to be generated between the second polarization orientation and the polarization orientation of the light incident upon the second polarizer after passing through the first LC cell and the given LC cell is 60 degrees (note that this angle can be on either side of the second polarization orientation), and (iii) the angle of rotation by which the first LC cell of the first LC layer rotates the light passing therethrough is 80 degrees with respect to the first polarization orientation (in other words, the polarization orientation of the light after passing through the first LC cell would make an angle of 10 degrees with respect to the second polarization orientation), and a direction of said rotation is clockwise. In such an example, the angle of rotation by which the given LC cell of the second LC layer rotates the light passing therethrough (to achieve the first output angle of 60 degrees) could be any one of: (i) 50 degrees or 110 degrees anti-clockwise, (ii) 70 degrees or 130 degrees clockwise.

In a second implementation, when generating the drive signals, the at least one processor is configured to:
  for another given LC cell of the first LC layer,
    determine a third viewing direction and a fourth viewing direction from which the first eye and the second eye view the another given LC cell of the first LC layer, respectively, based on a location of the another given LC cell in the first LC layer, and the relative location of the first eye and of the second eye of the at least one user with respect to the image plane;
    determine a third LC cell and a fourth LC cell of the second LC layer that lie along the third viewing direction and the fourth viewing direction, respectively;
    determine a third pixel location of a given third pixel of the first virtual image, based on the third viewing direction and the relative location of the first eye with respect to the image plane;
    determine a fourth pixel location of a given fourth pixel of the second virtual image, based on the fourth viewing direction and the relative location of the second eye with respect to the image plane;
    fetch, from the third pixel location in the first virtual image, a third intensity value of the given third pixel of the first virtual image;
    fetch, from the fourth pixel location in the second virtual image, a fourth intensity value of the given fourth pixel of the second virtual image; and
    generate respective drive signals for the another given LC cell of the first LC layer, the third LC cell of the second LC layer and the fourth LC cell of the second LC layer, based on the third intensity value of the given third pixel of the first virtual image, and the fourth intensity value of the given fourth pixel of the second virtual image.

The aforementioned steps have been provided with respect to the another given LC cell of the first LC layer. These steps can be performed in a similar manner for other LC cells of the first LC layer, to generate the drive signals for all the LC cells of the first LC layer and all the LC cells of the second LC layer.

The third viewing direction and the fourth viewing direction from which the first eye and the second eye view (namely, see) the another given LC cell of the first LC layer, respectively, can be determined, based on the field of view provided by the display device and the location of the another given LC cell in the first LC layer. It will be appreciated that the field of view provided by the display device can be determined as described earlier, because the width of the gap between the first LC layer and the second LC layer is negligible as compared to a distance between the display device and the eyes of the at least one user. The third LC cell and the fourth LC cell of the second LC layer that lie along the third viewing direction and the fourth viewing direction, respectively, can then be determined, based on the width of the gap between the first LC layer and the second LC layer, the size of the LC cell in the first LC layer, and the size of the LC cell in the second LC layer, as described earlier. The third pixel location of the given third pixel of the first virtual image can be determined by intersecting the third viewing direction with the image plane. The fourth pixel location of the given fourth pixel of the second virtual image can be determined in a similar manner.

The respective drive signals for the another given LC cell of the first LC layer, the third LC cell of the second LC layer and the fourth LC cell of the second LC layer are then generated, based on the third intensity value of the given third pixel of the first virtual image, and the fourth intensity value of the given fourth pixel of the second virtual image. Such generation of the drive signals can be performed by solving linear equations, for example, as described earlier. It will also be appreciated that not only there will be linear equations corresponding to different LC cells of the first LC layer, but also there will be interdependencies in these linear equations. This is primarily due to a fact that a particular LC cell in the first LC layer is utilised to generate two different pixels per user (because both the eyes see light passing through that particular LC cell), while its corresponding LC cells in the second LC layer are also utilised to generate two different pixels per user (because both the eyes see light passing through these corresponding LC cells also).

Optionally, when generating the respective drive signals for the another given LC cell, the third LC cell and the fourth LC cell, the at least one processor is configured to:
  determine, based on the third intensity value, a third output angle to be generated between the second polarization orientation of the second polarizer and a polarization orientation of light incident upon the second polarizer after passing through the another given LC cell and the third LC cell; and
  determine, based on the fourth intensity value, a fourth output angle to be generated between the second polarization orientation of the second polarizer and a polarization orientation of light incident upon the second polarizer after passing through the another given LC cell and the fourth LC cell, wherein the respective drive signals for the another given LC cell, the third LC cell and the fourth LC cell are generated based on the third output angle and the fourth output angle.

By determining the third output angle and the fourth output angle corresponding to the third intensity value and the fourth intensity value, respectively, individual drive signals for the another given LC cell of the first LC layer, the third LC cell of the second LC layer and the fourth LC cell of the second LC layer can be generated by solving two linear equations. One of the two linear equations takes into account an angle of rotation by which the another given LC cell of the first LC layer is to rotate the light passing therethrough and an angle of rotation by which the third LC cell of the second LC layer is to rotate the light passing therethrough, such that these angles of rotations result in the third output angle. Another of the two linear equations takes into account an angle of rotation by which the another given LC cell of the first LC layer is to rotate the light passing therethrough and the angle of rotation by which the fourth LC cell of the second LC layer is to rotate the light passing therethrough, such that these angles of rotations result in the fourth output angle. These two linear equations are also interdependent on two other linear equations for two other LC cells of the first LC layer (corresponding to the third LC cell and the fourth LC cell of the second LC layer), which are again interdependent on other linear equations.

Moreover, in some implementations, both the first LC layer and the second LC layer are configured to rotate the light passing therethrough in a same direction, namely, either clockwise or anti-clockwise, as described earlier. In other implementations, at least one of: the first LC layer, the second LC layer is configured to rotate the light passing therethrough in any direction, namely, clockwise or anti-clockwise, as described earlier. Optionally, in operation, a direction in which the another given LC cell rotates the polarization orientation of the light is opposite to a direction in which at least one of: the third LC cell, the fourth LC cell rotates the polarization orientation of the light. This allows for simplifying the linear equations, thereby saving processing resources of the at least one processor. This also allows for achieving accurate colour reproduction according to the first virtual image and the second virtual image.

Furthermore, optionally, the system further comprises at least one additional LC layer arranged between the second LC layer and the second polarizer, wherein the second LC layer and the at least one additional LC layer have a gap therebetween, the at least one additional LC layer comprising a plurality of LC cells, wherein the at least one processor is configured to generate drive signals for the LC cells of the at least one additional LC layer also, based on the first virtual image, the second virtual image, and the relative location of the first eye and of the second eye of the at least one user with respect to the image plane. It will be appreciated that in some implementations, the at least one additional LC layer could include a single additional LC layer; in other implementations, the at least one additional LC layer could include a plurality of additional LC layers. In case of the plurality of additional LC layers, there is a gap between adjacent LC layers. A technical benefit of having such additional LC layer(s) is that the multiscopic display can be provided to multiple users simultaneously. This is made possible due to a fact that having the at least one additional LC layer allows for achieving accurate colour reproduction according to respective first virtual images and respective second virtual images of the multiple users. This prevents ghosting artifacts and crosstalk, and makes the system more robust.

It will be appreciated that the aforementioned first implementation and the aforementioned second implementation could be adjusted according to the number of the additional LC layer(s). As an example, when the at least one additional LC layer comprises a single additional LC layer, the aforementioned first implementation could be adjusted as follows.

Optionally, when generating the drive signals, the at least one processor is configured to:
for the given LC cell of the second LC layer,
determine a fifth LC cell and a sixth LC cell of the at least one additional LC layer that lie along the first viewing direction and the second viewing direction, respectively, also; and
generate respective drive signals for the given LC cell of the second LC layer, the first LC cell of the first LC layer, the second LC cell of the first LC layer, the fifth LC cell of the at least one additional LC layer, and the sixth LC cell of the at least one additional LC layer, based on the first intensity value of the given first pixel of the first virtual image, and the second intensity value of the given second pixel of the second virtual image.

As another example, when the at least one additional LC layer comprises a single additional LC layer, the aforementioned second implementation could be adjusted as follows. Optionally, when generating the drive signals, the at least one processor is configured to:
for the another given LC cell of the first LC layer,
determine a seventh LC cell and an eighth LC cell of the at least one additional LC layer that lie along the third viewing direction and the fourth viewing direction, respectively, also; and
generate respective drive signals for the another given LC cell of the first LC layer, the third LC cell of the second LC layer, the fourth LC cell of the second LC layer, the seventh LC cell of the at least one additional LC layer, and the eighth LC cell of the at least one additional LC layer, based on the third intensity value of the given third pixel of the first virtual image, and the fourth intensity value of the given fourth pixel of the second virtual image.

Moreover, optionally, the system further comprises an optical combiner arranged on an optical path of the display device and on an optical path of a real-world light field of a real-world environment, wherein the optical combiner is employed to reflect the first part and the second part of the synthetic light field (corresponding to the first virtual image and the second virtual image) towards the first eye and the second eye, respectively, whilst optically combining the real-world light field with the first part and the second part of the synthetic light field. Optionally, the optical combiner is implemented as at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to the image plane of the display device lies in a range of 30 degrees and 60 degrees.

When the optical combiner reflects the first part of the synthetic light field towards the first eye, the first virtual image is presented to the first eye. Simultaneously, when the optical combiner reflects the second part of the synthetic light field towards the second eye, the second virtual image is presented to the second eye. As a result, virtual content represented in the first virtual image and the second virtual image is perceived by the left eye and the right eye, respectively, along with visual information pertaining to real-world objects present in the real-world environment. Advantageously, this provides a result that is similar to displaying a combined view of these virtual images augmenting respective real-world images to the at least one user.

Optionally, in the aforementioned first implementation, the at least one processor is configured to:
- determine an intensity of a part of the real-world light field passing through a given part of the optical combiner from which the light passing through the first LC cell of the first LC layer and the given LC cell of the second LC layer reflects towards the first eye;
- detect when the intensity of the part of the real-world light field passing through the given part of the optical combiner is lower than the first intensity value of the given first pixel of the first virtual image; and
- when it is detected that the intensity of said part of the real-world light field is lower than the first intensity value of the given first pixel of the first virtual image, adjust the first intensity value of the given first pixel, based on a difference between the first intensity value and the intensity of said part of the real-world light field.

When the intensity of the part of the real-world light field (passing through the given part of the optical combiner) is lower than the first intensity value of the given first pixel of the first virtual image, the intensity of the part of the real-world light field can be leveraged to produce at least a part of an overall intensity corresponding to the first intensity value. Therefore, the first intensity value of the given first pixel can be adjusted to only produce the difference between the overall intensity and the intensity of said part of the real-world light field. The adjusted first intensity value can then be utilised to generate the drive signals for the first LC cell and the given LC cell. Advantageously, this facilitates in reducing power consumption of the display device. Herein, the term "overall intensity" refers to an intensity of the synthetic light field that was originally intended to be presented to the at least one user. The overall intensity depends on the first intensity value of the given first pixel of the first virtual image.

The intensity of the part of the real-world light field (passing through the part of the optical combiner) can be determined by:
- utilising at least one real-world-facing camera of the system to capture at least one 2D real-world image of the real-world environment,
- reprojecting the at least one 2D real-world image from a perspective of the at least one real-world-facing camera to a perspective of the viewpoint of the first eye (for example, using depth data from a separate depth camera, or from a stereo disparity analysis of a pair of visible-light images of the real-world environment captured by a pair of visible-light cameras implemented as the at least one real-world-facing camera, or similar), and
- mapping the first viewing direction of the first eye with viewing directions of pixels in a reprojected version of the at least one 2D real-world image from the first eye.

Similarly, optionally, in the aforementioned first implementation, the at least one processor is configured to:
- determine an intensity of a part of the real-world light field passing through a given part of the optical combiner from which the light passing through the second LC cell of the first LC layer and the given LC cell of the second LC layer reflects towards the second eye;
- detect when the intensity of the part of the real-world light field passing through the given part of the optical combiner is lower than the second intensity value of the given second pixel of the second virtual image; and
- when it is detected that the intensity of said part of the real-world light field is lower than the second intensity value of the given second pixel of the second virtual image, adjust the second intensity value of the given second pixel, based on a difference between the second intensity value and the intensity of said part of the real-world light field.

The adjusted second intensity value can then be utilised to generate the drive signals for the second LC cell and the given LC cell. It will be appreciated that such adjusting of the first intensity value of the given first pixel and the second intensity value of the given second pixel can be performed by adjusting the aforementioned linear equations.

Likewise, optionally, in the aforementioned second implementation, the at least one processor is configured to:
- determine an intensity of a part of the real-world light field passing through a given part of the optical combiner from which the light passing through the another given LC cell of the first LC layer and the third LC cell of the second LC layer reflects towards the first eye;
- detect when the intensity of the part of the real-world light field passing through the given part of the optical combiner is lower than the third intensity value of the given third pixel of the first virtual image; and
- when it is detected that the intensity of said part of the real-world light field is lower than the third intensity value of the given third pixel of the first virtual image, adjust the third intensity value of the given third pixel, based on a difference between the third intensity value and the intensity of said part of the real-world light field.

Similarly, optionally, in the aforementioned second implementation, the at least one processor is configured to:
- determine an intensity of a part of the real-world light field passing through a given part of the optical combiner from which the light passing through the another given LC cell of the first LC layer and the fourth LC cell of the second LC layer reflects towards the second eye;
- detect when the intensity of the part of the real-world light field passing through the given part of the optical combiner is lower than the fourth intensity value of the given fourth pixel of the second virtual image; and
- when it is detected that the intensity of said part of the real-world light field is lower than the fourth intensity value of the given fourth pixel of the second virtual image, adjust the fourth intensity value of the given fourth pixel, based on a difference between the fourth intensity value and the intensity of said part of the real-world light field.

The adjusted third intensity value and the adjusted fourth intensity value can then be utilised to generate the drive signals for the another given LC cell, the third LC cell and the fourth LC cell. It will be appreciated that such adjusting of the third intensity value of the given third pixel and the fourth intensity value of the given fourth pixel can be performed by adjusting the aforementioned linear equations.

Moreover, optionally, the at least one processor is configured to:
- determine intensities of different parts of the real-world light field passing through the optical combiner towards a given eye;
- detect when an intensity of a given part of the real-world light field passing through a given part of the optical combiner towards the given eye is greater than a predefined threshold intensity; and
- when it is detected the intensity of the given part of the real-world light field passing through the given part of the optical combiner towards the given eye is greater than the predefined threshold intensity, dim pixels of the display device on whose optical path the given part of the optical combiner lies.

It will be appreciated that these pixels correspond to their respective LC cells in the first LC layer and the second LC layer. The aforementioned steps can be performed for each eye of the at least one user. In this regard, the intensities of the different parts of the real-world light field passing through the optical combiner towards the given eye can be determined as described earlier. As an example, said intensities can be determined in lux values. The predefined threshold intensity may, for example, lie in a range of 10000 lux to 25000 lux.

A technical benefit of dimming the pixels in such a case is that ghosting artefacts can be hidden in those part(s) of the optical combiner where the real-world light field has a relatively bright intensity (such that the virtual content would not be visible anyway). This also reduces the power consumption of the display device.

The present disclosure also relates to the method as described above. Various embodiments and variants disclosed above, with respect to the aforementioned first aspect, apply mutatis mutandis to the method.

In a first implementation, the step of generating the drive signals comprises:
for a given LC cell of the second LC layer,
- determining a first viewing direction and a second viewing direction from which the first eye and the second eye view the given LC cell of the second LC layer, respectively, based on a location of the given LC cell in the second LC layer, and the relative location of the first eye and of the second eye of the at least one user with respect to the image plane;
- determining a first LC cell and a second LC cell of the first LC layer that lie along the first viewing direction and the second viewing direction, respectively;
- determining a first pixel location of a given first pixel of the first virtual image, based on the first viewing direction and the relative location of the first eye with respect to the image plane;
- determining a second pixel location of a given second pixel of the second virtual image, based on the second viewing direction and the relative location of the second eye with respect to the image plane;
- fetching, from the first pixel location in the first virtual image, a first intensity value of the given first pixel of the first virtual image;
- fetching, from the second pixel location in the second virtual image, a second intensity value of the given second pixel of the second virtual image; and
- generating respective drive signals for the given LC cell of the second LC layer, the first LC cell of the first LC layer and the second LC cell of the first LC layer, based on the first intensity value of the given first pixel of the first virtual image, and the second intensity value of the given second pixel of the second virtual image.

Optionally, the step of generating the respective drive signals for the given LC cell, the first LC cell and the second LC cell comprises:
- determining, based on the first intensity value, a first output angle to be generated between the second polarization orientation of the second polarizer and a polarization orientation of light incident upon the second polarizer after passing through the first LC cell and the given LC cell; and
- determining, based on the second intensity value, a second output angle to be generated between the second polarization orientation of the second polarizer and a polarization orientation of light incident upon the second polarizer after passing through the second LC cell and the given LC cell, wherein the respective drive signals for the given LC cell of the second LC layer, the first LC cell of the first LC layer and the second LC cell of the first LC layer are generated based on the first output angle and the second output angle.

Optionally, in this regard, a direction in which the given LC cell rotates the polarization orientation of the light is opposite to a direction in which at least one of: the first LC cell, the second LC cell rotates the polarization orientation of the light.

In a second implementation, the step of generating the drive signals comprises:
for another given LC cell of the first LC layer,
- determining a third viewing direction and a fourth viewing direction from which the first eye and the second eye view the another given LC cell of the first LC layer, respectively, based on a location of the another given LC cell in the first LC layer, and the relative location of the first eye and of the second eye of the at least one user with respect to the image plane;
- determining a third LC cell and a fourth LC cell of the second LC layer that lie along the third viewing direction and the fourth viewing direction, respectively;
- determining a third pixel location of a given third pixel of the first virtual image, based on the third viewing direction and the relative location of the first eye with respect to the image plane;
- determining a fourth pixel location of a given fourth pixel of the second virtual image, based on the fourth viewing direction and the relative location of the second eye with respect to the image plane;
- fetching, from the third pixel location in the first virtual image, a third intensity value of the given third pixel of the first virtual image;
- fetching, from the fourth pixel location in the second virtual image, a fourth intensity value of the given fourth pixel of the second virtual image; and
- generating respective drive signals for the another given LC cell of the first LC layer, the third LC cell of the second LC layer and the fourth LC cell of the second LC layer, based on the third intensity value of the given third pixel of the first virtual image, and the fourth intensity value of the given fourth pixel of the second virtual image.

Optionally, the step of generating the respective drive signals for the another given LC cell, the third LC cell and the fourth LC cell comprises:
- determining, based on the third intensity value, a third output angle to be generated between the second polarization orientation of the second polarizer and a polarization orientation of light incident upon the second polarizer after passing through the another given LC cell and the third LC cell; and
- determining, based on the fourth intensity value, a fourth output angle to be generated between the second polarization orientation of the second polarizer and a polarization orientation of light incident upon the second polarizer after passing through the another given LC cell and the fourth LC cell, wherein the respective drive signals for the another given LC cell, the third LC cell and the fourth LC cell are generated based on the third output angle and the fourth output angle.

Optionally, in this regard, a direction in which the another given LC cell rotates the polarization orientation of the light is opposite to a direction in which at least one of: the third LC cell, the fourth LC cell rotates the polarization orientation of the light.

Moreover, optionally, the method further comprises:
- utilising the tracking means to determine a relative location of a head of the at least one user with respect to the image plane of the display device; and
- refining the relative location of the first eye and of the second eye, based on the relative location of the head of the at least one user.

Optionally, the display device further comprises at least one additional LC layer arranged between the second LC layer and the second polarizer, wherein the second LC layer and the at least one additional LC layer have a gap therebetween, the at least one additional LC layer comprising a plurality of LC cells, wherein the method further comprises generating drive signals for the LC cells of the at least one additional LC layer also, based on the first virtual image, the second virtual image, and the relative location of the first eye and of the second eye of the at least one user with respect to the image plane.

DETAILED DESCRIPTION OF THE DRAWINGS

FIG. 1A is a schematic illustration of a system 100 incorporating multiscopic display using stacked liquid crystal layers, in accordance with an embodiment of the present disclosure. The system 100 comprises tracking means 102, a display device 104 and at least one processor (depicted as a processor 106). The display device 104 comprises a backlight 108, a first polarizer 110 and a second polarizer 112, and a first LC layer 114 and a second LC layer 116 having a gap 118 therebetween. Each of the first LC layer 114 and the second LC layer 116 comprises a plurality of LC cells (depicted as separate boxes). The processor 106 is configured to:
- utilise the tracking means 102 to determine a relative location of a first eye 120a and of a second eye 120b of at least one user with respect to an image plane 122 of the display device 104;
- obtain a first virtual image and a second virtual image to be presented to the first eye 120a and the second eye 120b of the at least one user, respectively, based on the relative location of the first eye 120a and of the second eye 120b of the at least one user with respect to the image plane 122; and
- generate drive signals for the LC cells of the first LC layer 114 and the LC cells of the second LC layer 116, based on the first virtual image, the second virtual image, and the relative location of the first eye 120a and of the second eye 120b of the at least one user with respect to the image plane 122, wherein the LC cells of the first LC layer 114 and the LC cells of the second LC layer 116 are controlled using the drive signals, to adjust a polarization of light passing therethrough, for producing a synthetic light field presenting the first virtual image and the second virtual image to the first eye 120a and the second eye 120b of the at least one user, respectively.

Figure 1B:
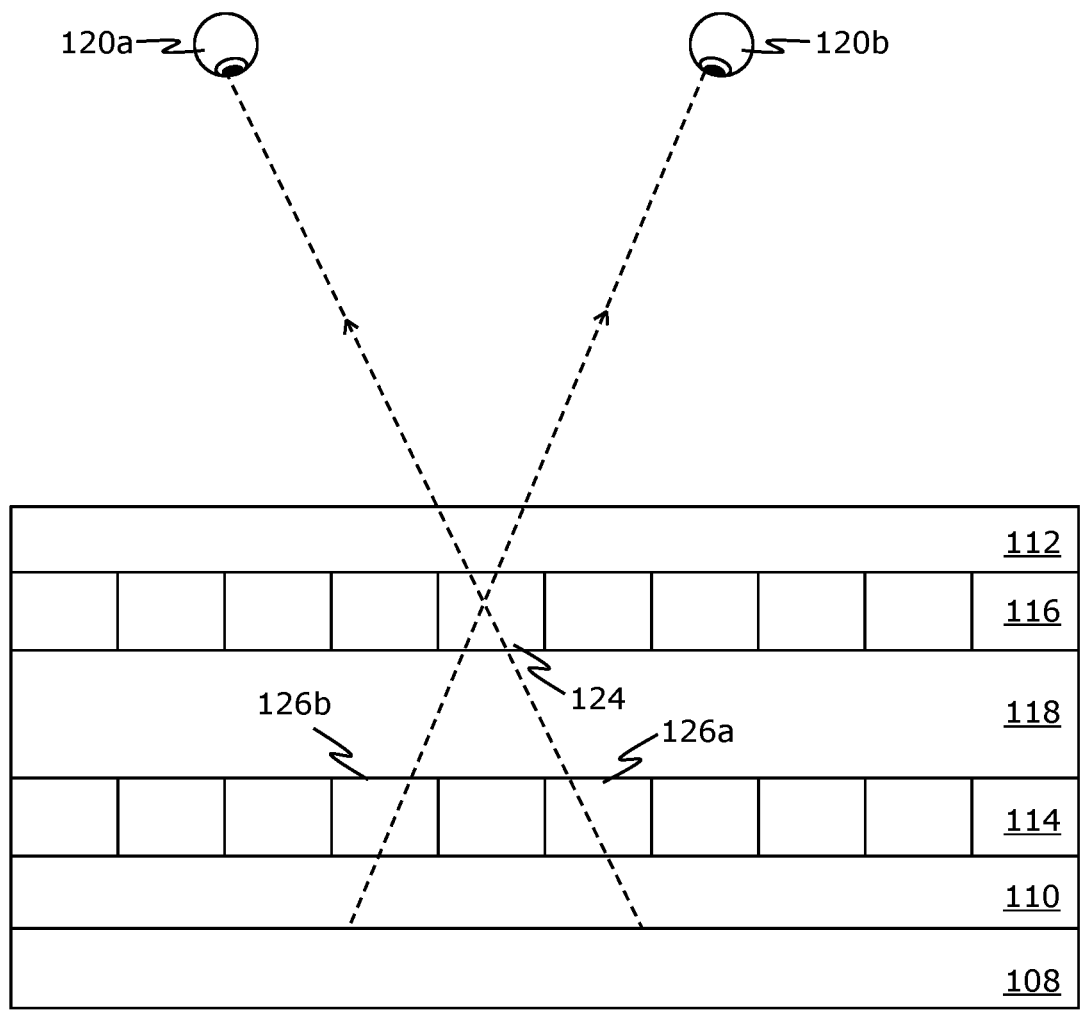
FIGS. 1B and 1C illustrate different implementations for achieving autostereoscopy and multiscopy using the system, in accordance with different embodiments of the present disclosure.
Figure 1C:
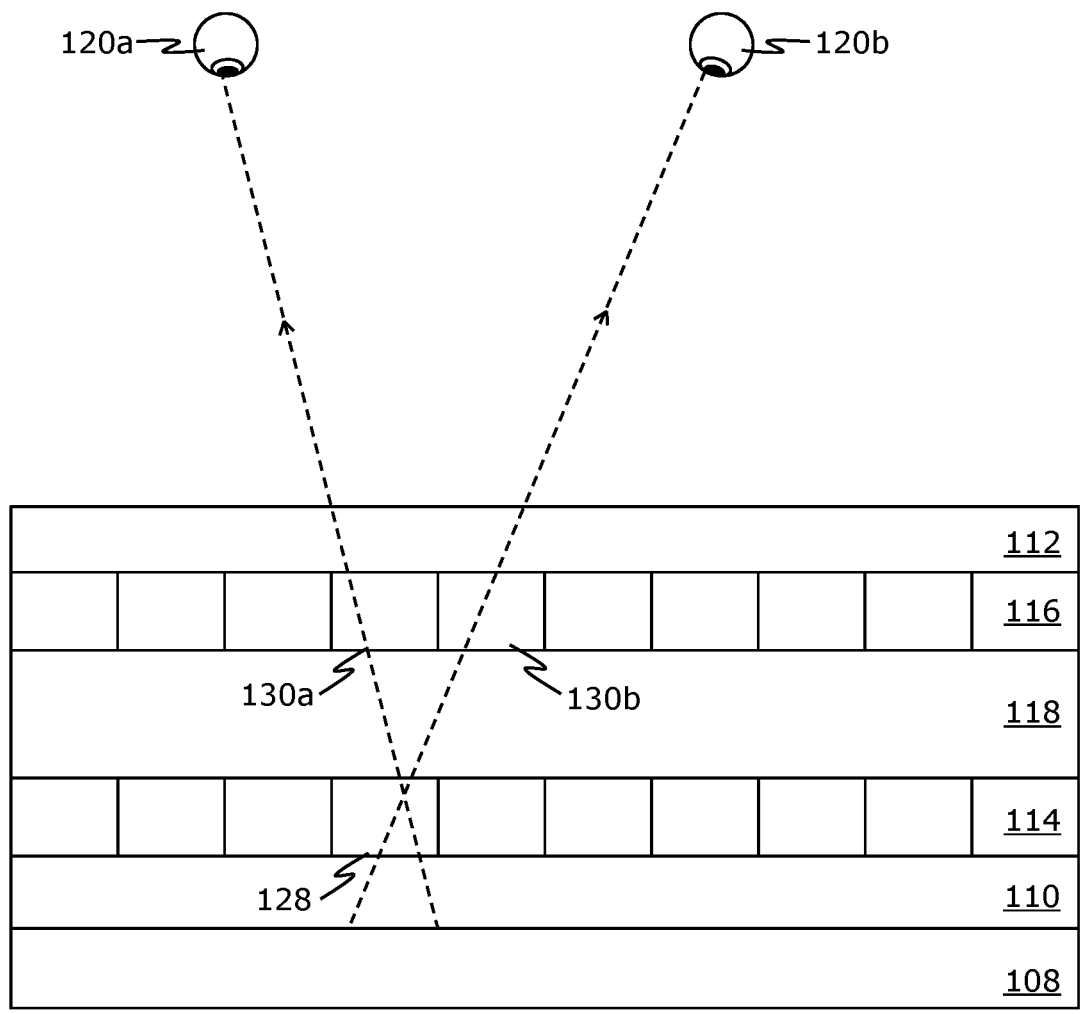

Referring to FIGS. 1B and 1C, there are illustrated different implementations for achieving autostereoscopy and multiscopy using the system 100, in accordance with different embodiments of the present disclosure. FIG. 1B depicts a first implementation, wherein when generating the drive signals, the processor 106 is configured to:
- for a given LC cell 124 of the second LC layer 116,
  - determine a first viewing direction and a second viewing direction from which the first eye 120a and the second eye 120b view the given LC cell 124 of the second LC layer 116, respectively, based on a location of the given LC cell 124 in the second LC layer 116, and the relative location of the first eye 120a and of the second eye 120b of the at least one user with respect to the image plane 122;
  - determine a first LC cell 126a and a second LC cell 126b of the first LC layer 114 that lie along the first viewing direction and the second viewing direction, respectively;
  - determine a first pixel location of a given first pixel of the first virtual image, based on the first viewing direction and the relative location of the first eye 120a with respect to the image plane 122;
  - determine a second pixel location of a given second pixel of the second virtual image, based on the second viewing direction and the relative location of the second eye 120b with respect to the image plane 122;
  - fetch, from the first pixel location in the first virtual image, a first intensity value of the given first pixel of the first virtual image;
  - fetch, from the second pixel location in the second virtual image, a second intensity value of the given second pixel of the second virtual image; and
  - generate respective drive signals for the given LC cell 124 of the second LC layer 116, the first LC cell 126a of the first LC layer 114 and the second LC cell 126b of the first LC layer 114, based on the first intensity value of the given first pixel of the first virtual image, and the second intensity value of the given second pixel of the second virtual image.

FIG. 1C depicts a second implementation, wherein when generating the drive signals, the processor 106 is configured to:
- for another given LC cell 128 of the first LC layer 114,
  - determine a third viewing direction and a fourth viewing direction from which the first eye 120a and the second eye 120b view the another given LC cell 128 of the first LC layer 114, respectively, based on a location of the another given LC cell 128 in the first LC layer 114, and the relative location of the first eye 120a and of the second eye 120b of the at least one user with respect to the image plane 122;

determine a third LC cell 130a and a fourth LC cell 130b of the second LC layer 116 that lie along the third viewing direction and the fourth viewing direction, respectively;

determine a third pixel location of a given third pixel of the first virtual image, based on the third viewing direction and the relative location of the first eye 120a with respect to the image plane 122;

determine a fourth pixel location of a given fourth pixel of the second virtual image, based on the fourth viewing direction and the relative location of the second eye 120b with respect to the image plane 122;

fetch, from the third pixel location in the first virtual image, a third intensity value of the given third pixel of the first virtual image;

fetch, from the fourth pixel location in the second virtual image, a fourth intensity value of the given fourth pixel of the second virtual image; and generate respective drive signals for the another given LC cell 128 of the first LC layer 114, the third LC cell 130a of the second LC layer 116 and the fourth LC cell 130b of the second LC layer 116, based on the third intensity value of the given third pixel of the first virtual image, and the fourth intensity value of the given fourth pixel of the second virtual image.

It may be understood by a person skilled in the art that FIG. 1A-1C include a simplified example implementation of the system 100, for sake of clarity, which should not unduly limit the scope of the claims herein. It is to be understood that the specific implementation of the system 100 is not to be construed as limiting it to specific numbers or types of tracking means, display devices, backlights, polarizers, LC layers and processors. The person skilled in the art will recognize many variations, alternatives, and modifications of embodiments of the present disclosure. For example, the system 100 could further comprise at least one additional LC layer, wherein there is a gap between adjacent LC layers.

Figure 2A:
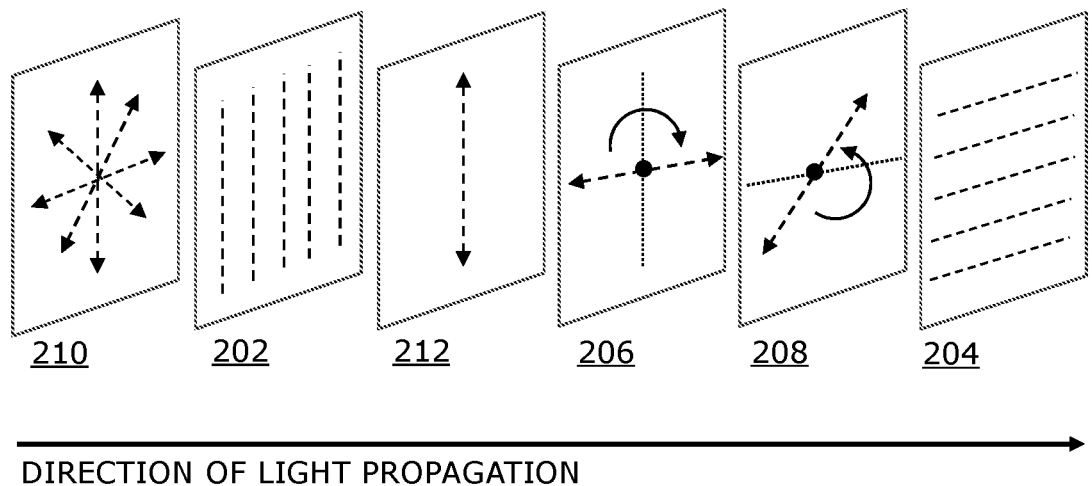
FIGS. 2A and 2B depict how various components of a display device can affect a polarization orientation of light passing therethrough, in accordance with an embodiment of the present disclosure.
Figure 2B:
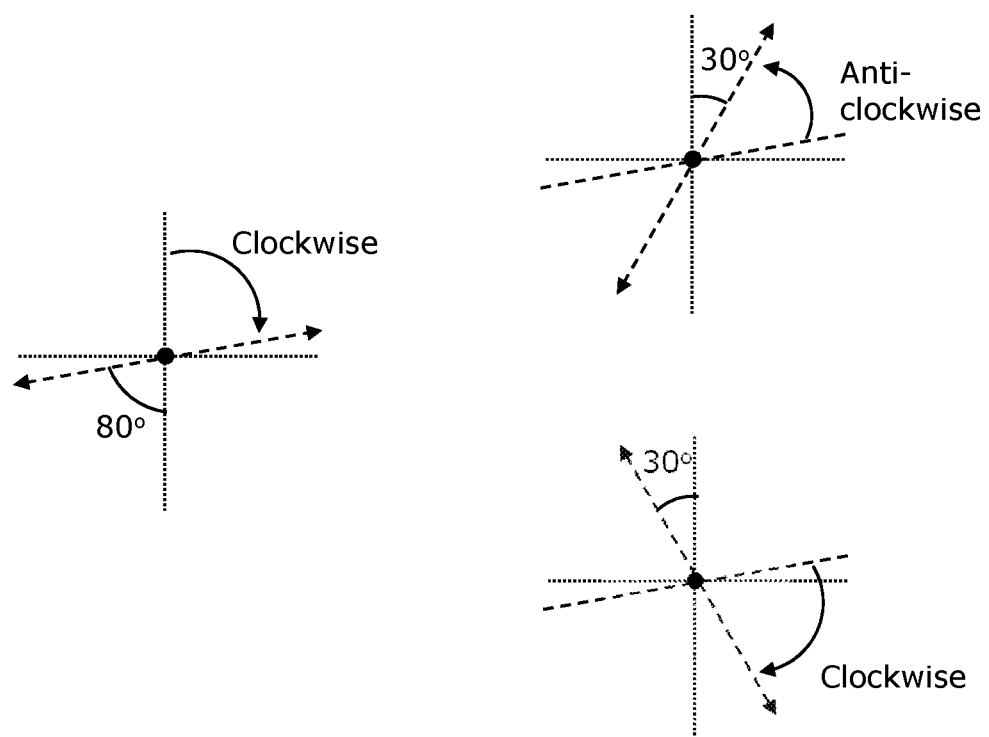

FIGS. 2A and 2B depict how various components of a display device can affect a polarization orientation of light passing therethrough, in accordance with an embodiment of the present disclosure. The display device comprises a backlight, a first polarizer 202 and a second polarizer 204, and a first LC layer 206 and a second LC layer 208 having a gap therebetween. There will now be considered an example, for illustration purposes only. In the example, the backlight emits light 210, which is shown as unpolarized light. A first polarization orientation of the first polarizer 202 is shown to be vertical, while a second polarization orientation of the second polarizer 204 is shown to be horizontal, for illustration purposes only. When the light 210 passes through the first polarizer 202, it becomes polarized light 212 having a same polarization orientation as the first polarization orientation of the first polarizer 202. The first LC layer 206 and the second LC layer 208 can be controlled to adjust the polarization orientation of the light 212 to adjust an intensity of the light passing through the second polarizer 204.

In the example, there will now be considered that an angle of rotation by which the first LC layer 206 rotates the light passing therethrough is 80 degrees with respect to the first polarization orientation (in other words, the polarization orientation of the light after passing through the first LC layer 206 would make an angle of 10 degrees with respect to the second polarization orientation of the second polarizer 204), and a direction of said rotation is clockwise, as shown on a left side of FIG. 2B. If a first output angle to be generated between the second polarization orientation of the second polarizer 204 and the polarization orientation of the light incident upon the second polarizer 204 after passing through the first LC layer 206 and the second LC layer 208 is 60 degrees, the angle of rotation by which the second LC layer 208 rotates the light passing therethrough (to achieve the first output angle of 60 degrees) could be any one of:

(a) 50 degrees anti-clockwise, as shown in a top part of a right side of FIG. 2B,
(b) 70 degrees clockwise, as shown in a bottom part of the right side of FIG. 2B,
(c) 110 degrees anti-clockwise, or
(d) 130 degrees clockwise.

Figure 3:
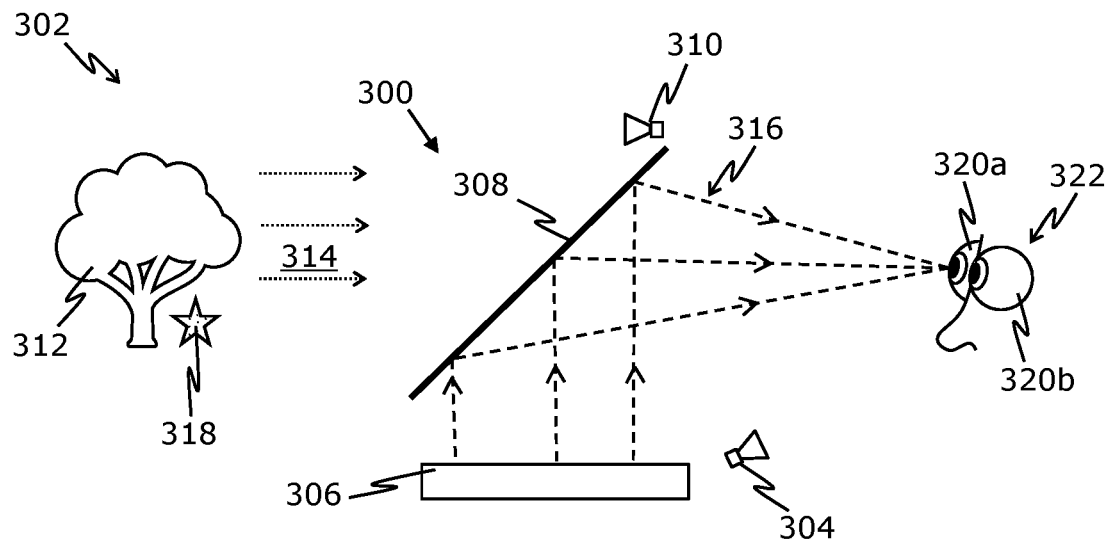
FIG. 3 depicts an implementation of a system incorporating multiscopic display using stacked liquid crystal layers within a real-world environment, in accordance with an embodiment of the present disclosure.

FIG. 3 depicts an implementation of a system 300 incorporating multiscopic display using stacked liquid crystal layers within a real-world environment 302, in accordance with an embodiment of the present disclosure. The system 300 comprises tracking means 304, a display device 306 and at least one processor (not shown). The at least one processor is configured to perform various operations as described earlier. Optionally, in this implementation, the system 300 further comprises an optical combiner 308 and a real-world-facing camera 310. In the real-world environment 302, there is at least one real-world object, depicted as a real-world object 312 (shown as a tree, for illustration purposes only). The optical combiner 308 is arranged on the optical path of the display device 306 and on an optical path of a real-world light field 314 of the real-world environment 302. The optical combiner 308 is employed to reflect a synthetic light field 316 presenting virtual content 318 (shown as a star, for illustration purposes only) produced by the display device 306 towards a first eye 320a and a second eye 320b of at least one user (depicted as a user 322), whilst optically combining the synthetic light field 316 with the real-world light field 314.

FIGS. 2A-2B and 3 are merely examples, which should not unduly limit the scope of the claims herein. A person skilled in the art will recognize many variations, alternatives, and modifications of embodiments of the present disclosure.

Figure 4:
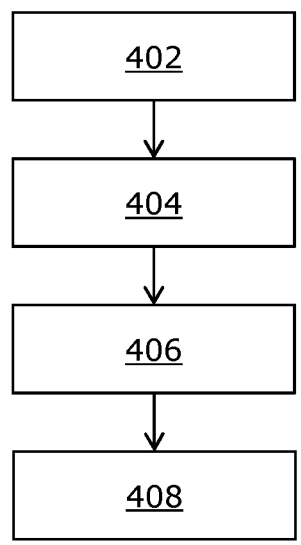
FIG. 4 depicts steps of a method incorporating multiscopic display using stacked liquid crystal layers, in accordance with an embodiment of the present disclosure.

Referring to FIG. 4, illustrated are steps of a method incorporating multiscopic display using stacked liquid crystal layers, in accordance with an embodiment of the present disclosure. At step 402, tracking means is utilised to determine a relative location of a first eye and of a second eye of at least one user with respect to an image plane of a display device.

The display device comprises a backlight, a first polarizer and a second polarizer, the first polarizer being arranged between the backlight and the second polarizer, and a first LC layer and a second LC layer arranged between the first polarizer and the second polarizer, the first LC layer being adjacent to the first polarizer, the second LC layer being adjacent to the second polarizer, wherein the first LC layer and the second LC layer have a gap therebetween, each of the first LC layer and the second LC layer comprising a plurality of LC cells. At step 404, a first virtual image and a second virtual image to be presented to the first eye and the second eye of the at least one user, respectively, are obtained, based on the relative location of the first eye and of the second eye of the at least one user with respect to the image plane. At step 406, drive signals are generated for the LC cells of the first LC layer and the LC cells of the second LC layer, based on the first virtual image, the second virtual image, and the relative location of the first eye and of the second eye of the at least one user with respect to the image plane. At step 408, the LC cells of the first LC layer and the LC cells of the second LC layer are controlled using the drive signals, to adjust a polarization of light passing therethrough, for producing a synthetic light field presenting the first virtual image and the second virtual image to the first eye and the second eye of the at least one user, respectively.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
 tracking means;
 a display device comprising:
  a backlight;
  a first polarizer and a second polarizer having a first polarization orientation and a second polarization orientation, respectively, wherein the first polarizer is arranged between the backlight and the second polarizer; and
  a first liquid crystal layer and a second LC layer arranged between the first polarizer and the second polarizer, the first LC layer being adjacent to the first polarizer, the second LC layer being adjacent to the second polarizer, wherein the first LC layer and the second LC layer have a gap therebetween, each of the first LC layer and the second LC layer comprising a plurality of LC cells; and
 at least one processor configured to:
  utilise the tracking means to determine a relative location of a first eye and of a second eye of at least one user with respect to an image plane of the display device;
  obtain a first virtual image and a second virtual image to be presented to the first eye and the second eye of the at least one user, respectively, based on the relative location of the first eye and of the second eye of the at least one user with respect to the image plane; and
  generate drive signals for the LC cells of the first LC layer and the LC cells of the second LC layer, based on the first virtual image, the second virtual image, and the relative location of the first eye and of the second eye of the at least one user with respect to the image plane,
 wherein the LC cells of the first LC layer and the LC cells of the second LC layer are controlled using the drive signals, to adjust a polarization of light passing therethrough, for producing a synthetic light field presenting the first virtual image and the second virtual image to the first eye and the second eye of the at least one user, respectively.

2. The system of claim 1, wherein when generating the drive signals, the at least one processor is configured to:
 for a given LC cell of the second LC layer,
  determine a first viewing direction and a second viewing direction from which the first eye and the second eye view the given LC cell of the second LC layer, respectively, based on a location of the given LC cell in the second LC layer, and the relative location of the first eye and of the second eye of the at least one user with respect to the image plane;
  determine a first LC cell and a second LC cell of the first LC layer that lie along the first viewing direction and the second viewing direction, respectively;
  determine a first pixel location of a given first pixel of the first virtual image, based on the first viewing direction and the relative location of the first eye with respect to the image plane;
  determine a second pixel location of a given second pixel of the second virtual image, based on the second viewing direction and the relative location of the second eye with respect to the image plane;
  fetch, from the first pixel location in the first virtual image, a first intensity value of the given first pixel of the first virtual image;
  fetch, from the second pixel location in the second virtual image, a second intensity value of the given second pixel of the second virtual image; and
  generate respective drive signals for the given LC cell of the second LC layer, the first LC cell of the first LC layer and the second LC cell of the first LC layer, based on the first intensity value of the given first pixel of the first virtual image, and the second intensity value of the given second pixel of the second virtual image.

3. The system of claim 2, wherein when generating the respective drive signals for the given LC cell, the first LC cell and the second LC cell, the at least one processor is configured to:
 determine, based on the first intensity value, a first output angle to be generated between the second polarization orientation of the second polarizer and a polarization orientation of light incident upon the second polarizer after passing through the first LC cell and the given LC cell; and
 determine, based on the second intensity value, a second output angle to be generated between the second polarization orientation of the second polarizer and a polarization orientation of light incident upon the second polarizer after passing through the second LC cell and the given LC cell,
 wherein the respective drive signals for the given LC cell of the second LC layer, the first LC cell of the first LC layer and the second LC cell of the first LC layer are generated based on the first output angle and the second output angle.

4. The system of claim 3, wherein, in operation, a direction in which the given LC cell rotates the polarization orientation of the light is opposite to a direction in which at least one of: the first LC cell, the second LC cell rotates the polarization orientation of the light.

5. The system of claim 1, wherein when generating the drive signals, the at least one processor is configured to:
 for another given LC cell of the first LC layer,
  determine a third viewing direction and a fourth viewing direction from which the first eye and the second eye view the another given LC cell of the first LC layer, respectively, based on a location of the another given LC cell in the first LC layer, and the relative location of the first eye and of the second eye of the at least one user with respect to the image plane;
  determine a third LC cell and a fourth LC cell of the second LC layer that lie along the third viewing direction and the fourth viewing direction, respectively;
  determine a third pixel location of a given third pixel of the first virtual image, based on the third viewing direction and the relative location of the first eye with respect to the image plane;
  determine a fourth pixel location of a given fourth pixel of the second virtual image, based on the fourth viewing direction and the relative location of the second eye with respect to the image plane;

fetch, from the third pixel location in the first virtual image, a third intensity value of the given third pixel of the first virtual image;

fetch, from the fourth pixel location in the second virtual image, a fourth intensity value of the given fourth pixel of the second virtual image; and generate respective drive signals for the another given LC cell of the first LC layer, the third LC cell of the second LC layer and the fourth LC cell of the second LC layer, based on the third intensity value of the given third pixel of the first virtual image, and the fourth intensity value of the given fourth pixel of the second virtual image.

6. The system of claim 5, wherein when generating the respective drive signals for the another given LC cell, the third LC cell and the fourth LC cell, the at least one processor is configured to:

determine, based on the third intensity value, a third output angle to be generated between the second polarization orientation of the second polarizer and a polarization orientation of light incident upon the second polarizer after passing through the another given LC cell and the third LC cell; and determine, based on the fourth intensity value, a fourth output angle to be generated between the second polarization orientation of the second polarizer and a polarization orientation of light incident upon the second polarizer after passing through the another given LC cell and the fourth LC cell, wherein the respective drive signals for the another given LC cell, the third LC cell and the fourth LC cell are generated based on the third output angle and the fourth output angle.

7. The system of claim 6, wherein, in operation, a direction in which the another given LC cell rotates the polarization orientation of the light is opposite to a direction in which at least one of: the third LC cell, the fourth LC cell rotates the polarization orientation of the light.

8. The system of claim 1, wherein the at least one processor is configured to:

utilise the tracking means to determine a relative location of a head of the at least one user with respect to the image plane of the display device; and refine the relative location of the first eye and of the second eye, based on the relative location of the head of the at least one user.

9. The system of claim 1, further comprising at least one additional LC layer arranged between the second LC layer and the second polarizer, wherein the second LC layer and the at least one additional LC layer have a gap therebetween, the at least one additional LC layer comprising a plurality of LC cells, wherein the at least one processor is configured to generate drive signals for the LC cells of the at least one additional LC layer also, based on the first virtual image, the second virtual image, and the relative location of the first eye and of the second eye of the at least one user with respect to the image plane.

10. The system of claim 1, further comprising a colour filter array arranged adjacent to the second LC layer, and between the second LC layer and the second polarizer.

11. The system of claim 1, further comprising an optical combiner arranged on an optical path of the display device and on an optical path of a real-world light field of a real-world environment, wherein the optical combiner is employed to reflect a first part and a second part of the synthetic light field towards the first eye and the second eye, respectively, whilst optically combining the real-world light field with the first part and the second part of the synthetic light field.

12. A method comprising:

utilising tracking means to determine a relative location of a first eye and of a second eye of at least one user with respect to an image plane of a display device, the display device comprising a backlight, a first polarizer and a second polarizer, the first polarizer being arranged between the backlight and the second polarizer, and a first liquid crystal layer and a second LC layer arranged between the first polarizer and the second polarizer, the first LC layer being adjacent to the first polarizer, the second LC layer being adjacent to the second polarizer, wherein the first LC layer and the second LC layer have a gap therebetween, each of the first LC layer and the second LC layer comprising a plurality of LC cells;

obtaining a first virtual image and a second virtual image to be presented to the first eye and the second eye of the at least one user, respectively, based on the relative location of the first eye and of the second eye of the at least one user with respect to the image plane;

generating drive signals for the LC cells of the first LC layer and the LC cells of the second LC layer, based on the first virtual image, the second virtual image, and the relative location of the first eye and of the second eye of the at least one user with respect to the image plane; and controlling the LC cells of the first LC layer and the LC cells of the second LC layer using the drive signals, to adjust a polarization of light passing therethrough, for producing a synthetic light field presenting the first virtual image and the second virtual image to the first eye and the second eye of the at least one user, respectively.

13. The method of claim 12, wherein the step of generating the drive signals comprises:

for a given LC cell of the second LC layer, determining a first viewing direction and a second viewing direction from which the first eye and the second eye view the given LC cell of the second LC layer, respectively, based on a location of the given LC cell in the second LC layer, and the relative location of the first eye and of the second eye of the at least one user with respect to the image plane;

determining a first LC cell and a second LC cell of the first LC layer that lie along the first viewing direction and the second viewing direction, respectively;

determining a first pixel location of a given first pixel of the first virtual image, based on the first viewing direction and the relative location of the first eye with respect to the image plane;

determining a second pixel location of a given second pixel of the second virtual image, based on the second viewing direction and the relative location of the second eye with respect to the image plane;

fetching, from the first pixel location in the first virtual image, a first intensity value of the given first pixel of the first virtual image;

fetching, from the second pixel location in the second virtual image, a second intensity value of the given second pixel of the second virtual image; and generating respective drive signals for the given LC cell of the second LC layer, the first LC cell of the first LC layer and the second LC cell of the first LC layer, based on the first intensity value of the given first pixel of the first virtual image, and the second intensity value of the given second pixel of the second virtual image.

14. The method of claim 13, wherein the step of generating the respective drive signals for the given LC cell, the first LC cell and the second LC cell comprises:
   determining, based on the first intensity value, a first output angle to be generated between the second polarization orientation of the second polarizer and a polarization orientation of light incident upon the second polarizer after passing through the first LC cell and the given LC cell; and
   determining, based on the second intensity value, a second output angle to be generated between the second polarization orientation of the second polarizer and a polarization orientation of light incident upon the second polarizer after passing through the second LC cell and the given LC cell,
wherein the respective drive signals for the given LC cell of the second LC layer, the first LC cell of the first LC layer and the second LC cell of the first LC layer are generated based on the first output angle and the second output angle.

15. The method of claim 14, wherein a direction in which the given LC cell rotates the polarization orientation of the light is opposite to a direction in which at least one of: the first LC cell, the second LC cell rotates the polarization orientation of the light.

16. The method of claim 12, wherein the step of generating the drive signals comprises:
   for another given LC cell of the first LC layer,
      determining a third viewing direction and a fourth viewing direction from which the first eye and the second eye view the another given LC cell of the first LC layer, respectively, based on a location of the another given LC cell in the first LC layer, and the relative location of the first eye and of the second eye of the at least one user with respect to the image plane;
      determining a third LC cell and a fourth LC cell of the second LC layer that lie along the third viewing direction and the fourth viewing direction, respectively;
      determining a third pixel location of a given third pixel of the first virtual image, based on the third viewing direction and the relative location of the first eye with respect to the image plane;
      determining a fourth pixel location of a given fourth pixel of the second virtual image, based on the fourth viewing direction and the relative location of the second eye with respect to the image plane;
      fetching, from the third pixel location in the first virtual image, a third intensity value of the given third pixel of the first virtual image;
      fetching, from the fourth pixel location in the second virtual image, a fourth intensity value of the given fourth pixel of the second virtual image; and
      generating respective drive signals for the another given LC cell of the first LC layer, the third LC cell of the second LC layer and the fourth LC cell of the second LC layer, based on the third intensity value of the given third pixel of the first virtual image, and the fourth intensity value of the given fourth pixel of the second virtual image.

17. The method of claim 16, wherein the step of generating the respective drive signals for the another given LC cell, the third LC cell and the fourth LC cell comprises:
   determining, based on the third intensity value, a third output angle to be generated between the second polarization orientation of the second polarizer and a polarization orientation of light incident upon the second polarizer after passing through the another given LC cell and the third LC cell; and
   determining, based on the fourth intensity value, a fourth output angle to be generated between the second polarization orientation of the second polarizer and a polarization orientation of light incident upon the second polarizer after passing through the another given LC cell and the fourth LC cell,
wherein the respective drive signals for the another given LC cell, the third LC cell and the fourth LC cell are generated based on the third output angle and the fourth output angle.

18. The method of claim 17, wherein a direction in which the another given LC cell rotates the polarization orientation of the light is opposite to a direction in which at least one of: the third LC cell, the fourth LC cell rotates the polarization orientation of the light.

19. The method of claim 12, further comprising:
   utilising the tracking means to determine a relative location of a head of the at least one user with respect to the image plane of the display device; and
   refining the relative location of the first eye and of the second eye, based on the relative location of the head of the at least one user.

20. The method of claim 12, wherein the display device further comprises at least one additional LC layer arranged between the second LC layer and the second polarizer, wherein the second LC layer and the at least one additional LC layer have a gap therebetween, the at least one additional LC layer comprising a plurality of LC cells, wherein the method further comprises generating drive signals for the LC cells of the at least one additional LC layer also, based on the first virtual image, the second virtual image, and the relative location of the first eye and of the second eye of the at least one user with respect to the image plane.

* * * * *